Patented May 31, 1932

1,860,431

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PROCESS OF PRODUCING LOW-VISCOSITY CELLULOSE FIBER

No Drawing.   Application filed June 2, 1928. Serial No. 282,503.

In the manufacture of various cellulose products such as artificial silk, lacquers, and fibers, it is the practice to convert cellulose fiber into a derivative such as xanthate, nitrate, or acetate, and then to dissolve the derivative in a suitable solvent or mixture of solvents before forming into the ultimate product. In order to produce solutions of a viscosity sufficiently low to permit spinning into silk filaments, or use as lacquers, or forming into films, it is necessary to depolymerize to lower the solution viscosity of the fiber used as a raw material, or to treat the derivative prepared therefrom in a manner to lower its viscosity. In the viscose-rayon industry, for example, depolymerization of the fiber is effected by soaking sheets of fiber with a caustic soda solution of mercerizing strength, pressing the sheets free of excess solution and disintegrating them into a fluffy mass, and finally ageing the mass for a considerable period of time. Not only is such a process time-consuming and expensive, but the ageing conditions must be carefully controlled to prevent degradation of the fiber into oxycelluloses and other undesirable reaction products. When the derivative is treated to lower its viscosity, as nitrocellulose sometimes is, under heat and pressure, not only must it be handled in comparatively small batches, but the treatment must also be carefully controlled to prevent decomposition from taking place.

The term "solution viscosity" as herein applied to cellulose fiber is an arbitrary one, being indicative of the viscosity of a cellulose derivative solution preparable therefrom. The solution usually employed as a standard is a cuprammonium cellulose solution of prescribed cellulose concentration, the viscosity being determined by measuring the time of efflux of a definite volume of such solution under standard conditions, through an orifice of standard size. The solution viscosity of fiber is herein given in absolute C. G. S. units, and is determined by measuring the viscosity of a solution of 6 grams of fiber in a cuprammonium solution composed of 225 cc. of 28% ammonia water containing 9 grams of cuprous oxide. The C. G. S. unit is employed because it is definite, denoting a viscosity 100 times that of water at 20° C., wherefore a cuprammonium cellulose solution of standard composition identifying a fiber as having a solution viscosity of 10 is 1000 times as viscous as water at 20° C. Glycerine, which is often referred to when dealing with the solution viscosity of cellulose fiber, for example, has a value of between 8 and 10 units.

One of the objects of the present invention is to provide a process for materially lowering the solution viscosity of cellulose fiber while it is in the form of an aqueous pulp of, say, about 2% to 10% fiber concentration, as this permits easy and continuous handling of large amounts of fiber by the use of comparatively inexpensive apparatus. Another object of the present invention is to effect a lowering of the solution viscosity of cellulose fiber substantially without affecting its alpha cellulose content, so that the fiber will not become impaired in value for use as a raw material. I have discovered that these objects may be attained by treating cellulose fiber in water-containing metal compounds, preferably ferric compounds such as the hydroxide, which may be used in a colloidal state, the basic ferric salts, the nitrate, chloride, sulphate and citrate, as these compounds rapidly lower the solution viscosity of the fiber to a marked degree, even when used in comparatively small amount. It is preferable to maintain an alkaline condition in such water, as under such condition the alpha cellulose content of the fiber may be preserved or even raised, depending upon the type of fiber used as a raw material and the alkalinity of the solution. As is well known, when an alkali, such as caustic soda, is added to a solution of ferric nitrate or other ferric salt, as hereinafter described, a colloidal solution of ferric oxide is produced.

Cellulose fibers of various origins may be processed according to the present invention. For instance, I may start with a white wood fiber which has been refined to an alpha cellulose content of about 94% and which has a solution viscosity of about 5 to 9, or with cotton fiber in the form of long staples, cotton linters, or rag pulp and having a viscosity of about 5 to 50, or with chemical wood pulp such as bleached sulphite having an alpha cellulose content of about 86% and a viscosity of about 5 to 7. So, too, I may use raw or intermediate pulps such as unbleached, refined wood pulp, unbleached sulphite pulp, or even kraft pulp, as the raw material,—the bleaching treatment or the refining treatment being effected after the viscosity of the fiber has been lowered.

When ferric compounds such as ferric nitrate are employed in lowering the viscosity of a white fiber, the fiber assumes a distinctly brown color, as a result of the fixation of iron compound thereon. The brown color may be removed, however, by treating the fiber in acid solution, a dilute solution of oxalic acid being especially suitable for this purpose, as the alpha cellulose content of the fiber is substantially unaffected thereby. This result may also be accomplished by the use of a relatively very small amount of acidic permanganate, only enough permanganate being used to remove the color, as an excess would affect the alpha cellulose content of the fiber. The fiber may then be washed and converted into cellulose derivatives, which, without further treatment give solutions of low viscosity. For instance, the washed fiber may be treated with caustic soda solution of mercerizing strength and, without any ageing whatever, converted into xanthate syrups suitable for spinning into silk filaments. Or it may be formed into waterleaf paper which may be used as the raw material for derivative preparation. The following table gives the conditions under which a series of treatments were carried out, and the alpha cellulose content and viscosity of the resulting product. A white, refined wood fiber having an alpha cellulose content of 94.5% and a viscosity of 8.00 was employed as the raw material. In each treatment, a ferric nitrate solution of 0.25% was used, the fiber being digested therein at 100° C. at a fiber concentration of 4%.

| % NaOH (based on pulp) | Time (hrs.) | % Alpha cellulose in product | Viscosity of product |
|---|---|---|---|
| Group A { 0 | ½ | 94.9 | 2 |
| 0 | 1 | 94.7 | 1.20 |
| 0 | 2 | 94.2 | 0.57 |
| Group B { 0.5 | ½ | 95.0 | 2.30 |
| 0.5 | 1 | 94.4 | 1.40 |
| 0.5 | 2 | 94.1 | 0.55 |
| Group C { 1.0 | 1 | 95.7 | 2.80 |
| 1.0 | 2 | 95.0 | 1.25 |
| 1.0 | 3 | 95.3 | 0.85 |
| Group D { 2.0 | 1 | 95.8 | 3.20 |
| 2.0 | 2 | 95.8 | 3.70 |
| 2.0 | 3 | 96.3 | 3.50 |

From the foregoing table, it is clear that by choosing the appropriate conditions of treatment, for instance those of the third treatment of Groups, A, B, and C, the viscosity of the fiber may be lowered to a value of less than 1, this being the value especially desired when the fiber is to be used as a raw material in the manufacture of cellulose products of the character described. The presence of caustic soda apparently increases the alpha cellulose content of the fiber, but retards the reaction, as indicated in Groups B and C, and when used in excessive amount, as in Group D, apparently stops the reaction at a solution viscosity value higher than would be reached with little or no caustic soda.

After treatment in ferric nitrate solution as described, the fiber has a color even darker than that of kraft pulp. Its original whiteness may be regained, however, by boiling it in a solution of oxalic acid of about 0.2% to 0.5% strength. The fiber is then washed with water to remove the acid contained therein. The resulting white product lends itself well for use as a raw material for derivative preparation, either in dry bulk condition or after forming into waterleaf paper.

The foregoing examples are merely illustrative of a wide variety of treatments which may be practised in accordance with the present invention, using other fibers such as sulphite pulp, other ferric salts such as ferric chloride, and different conditions of time, temperature, and fiber and chemical concentration. For instance, experiments at lower treating temperatures, e. g. at 80° C., indicate that results are similar to those obtained at 100° C. if the treatment with solutions of ferric compounds is carried out for a longer period of time. Even at lower temperatures, such as room temperature, a substantial lowering of solution viscosity of the fiber may be effected, particularly when a small amount of oxidant such as hypochloride is used together with the ferric compound. Similar experiments carried out with hypochlorite solutions lacking the presence of a ferric compound indicated that such solutions have very much less effect in lowering the solution viscosity of the fiber. Other metal compounds, such as the ferrous salts, or the compounds of manganese, nickel, and cobalt may be used, the iron compounds and the higher valence or "ic" compounds of any metal, including iron, being preferred, as these apparently lower the solution viscosity of the fiber to a greater degree and in a shorter period of time than the other compounds. While it is usually more expedient to digest fiber under atmospheric pressure, if desired this may be performed in closed digesters under super atmospheric pressure and at temperatures above 100° C., in which case the reaction is hastened. If desired, gaseous oxidants such as air, oxygen, or ozone may be introduced into the fiber suspension while it is being digested, to affect or control the rate of reaction. So, too, oxidants such as sodium or calcium hypochlorite, sodium peroxide, or hydrogen peroxide may be used to accelerate the reaction, in the case of the hypochlorites it being quite desirable to use a distinctly alkaline solution to prevent degradation of the fiber into oxycelluloses.

One of the important advantages of the process of the present invention is that it makes possible the preparation of a new product, namely, a fiber of high alpha cellulose content, of very low solution viscosity, and in an unmercerized condition. Such a product is especially desirable, as some esterification processes call for the use of a fiber which is in an unmercerized condition. Furthermore, the new product upon beating responds to hydration or gelatinization quite satisfactorily, so that it may be sheeted on a paper machine, for instance, into waterleaf papers eminently suitable for use as a raw material for cellulose derivative manufacture, whereas mercerized cellulose fiber is non-hydratable and is consequently unsuitable for paper formation.

Having thus described certain embodiments of this invention, it will be evident to those skilled in the art that various changes and modifications might be made therein without departing from the spirit or scope of invention as set forth in the appended claims.

What I claim is:

1. A process of lowering the solution viscosity of cellulose fiber, which comprises digesting the fiber as a suspension in a hot solution of the "ic" compound of a metal of the iron-cobalt-nickel group.

2. A process of lowering the solution viscosity of cellulose fiber, which comprises digesting the fiber in a hot solution of a ferric compound.

3. A process of lowering the solution viscosity of cellulose fiber, which comprises digesting the fiber in hot alkaline water containing a ferric compound.

4. A process which comprises treating cellulose fiber in a solution of ferric compound, and then dissolving the ferric compound deposited on the fiber.

5. A process which comprises treating cellulose fiber in a solution of ferric compound, and then treating the fiber in an oxalic acid solution.

6. A process which comprises digesting cellulose fiber in a hot dilute solution of a ferric compound, and then treating the fiber in a dilute oxalic acid solution.

7. A process of lowering the solution viscosity of cellulose fiber, which comprises treating the fiber in a solution of a metal compound while introducing oxygen into the solution, the metal of said metal compound being of the iron-cobalt-nickel group.

8. A process of lowering the solution viscosity of cellulose fiber, which comprises treating the fiber in a solution of a metal compound containing an oxidant, the metal of said metal compound being of the iron-cobalt-nickel group.

9. A process of lowering the solution viscosity of cellulose fiber, which comprises treating the fiber in a solution of a metal compound containing hypochlorite, the metal of said metal compound being of the iron-cobalt-nickel group.

10. A process of lowering the solution viscosity of cellulose fiber, which comprises treating the fiber in an alkaline solution of a metal compound containing an oxidant, the metal of said metal compound being of the iron-cobalt-nickel group.

11. A process which comprises treating white cellulose fiber at a stock consistency of about 4% to 10% in a dilute solution of a ferric salt until its solution viscosity has been lowered to a value less than 1, and then treating the resulting fiber in an oxalic acid solution to remove the color imparted thereto by the ferric salt solution.

12. A product consisting of cellulose fiber of the character of unmercerized wood pulp of at least about 94% alpha cellulose content and of sufficiently low solution viscosity to be capable of xanthation without any ageing whatever.

13. A product consisting of cellulose fiber of the character of unmercerized wood pulp of at least about 94% alpha cellulose content, having a solution viscosity of less than 1 absolute C. G. S. units.

14. A product consisting of white, cellulose fiber of the character of unmercerized wood pulp of at least about 94% alpha cellulose content and having a solution viscosity of less than 1 absolute C. G. S. units.

15. A waterleaf paper consisting of cellulose fiber of the character of unmercerized wood pulp of an alpha cellulose content of at least about 94% and having a solution viscosity less than 1 absolute C. G. S. units.

16. A process which comprises treating cellulose pulp as a suspension in a solution of the compound of a metal having an atomic weight ranging from 56 to 59, beating such pulp, and sheeting into paper.

17. A process which comprises treating cellulose pulp as a suspension in a solution of the compound of a metal having an atomic weight ranging from 56 to 59, beating such pulp, sheeting into paper, and converting the paper into cellulose derivatives.

18. A process which comprises treating cellulose fiber as a suspension in a solution of the compound of a metal of the iron-cobalt-nickel group to lower the solution viscosity of such fiber, and converting the resulting low viscosity fiber into cellulose derivatives.

19. A process of lowering the solution viscisity of cellulose fiber, which comprises treating such fiber in a colloidal aqueous solution of ferric oxide.

20. A process of lowering the solution viscosity of cellulose fiber, which comprises treating such fiber in a colloidal aqueous solution of ferric oxide maintained in alkaline condition.

21. A process of lowering the solution viscosity of cellulose fiber, which comprises treating such fiber in a colloidal aqueous solution of ferric oxide, and treating the resulting fiber in an oxalic acid solution to remove the color imparted thereto by the ferric hydroxide solution.

22. A process of lowering the solution viscosity of cellulose fiber, which comprises treating such fiber in a colloidal aqueous solution of ferric oxide, treating the resulting fiber in an oxalic acid solution to remove the color imparted thereto by the ferric hydroxide solution, and converting the resulting white fiber into cellulose derivatives.

23. A waterleaf paper consisting of cellulose fiber of the character of unmercerized wood pulp of at least about 94% alpha cellulose content and of sufficiently low solution viscosity to be capable of xanthation without any ageing whatever.

24. A process of lowering the solution viscosity of cellulose fiber which comprises treating such fiber in water containing alkali in non-mercerizing amount and a compound of a metal of the iron-cobalt-nickel group.

25. A process of lowering the solution viscosity of cellulose fiber which comprises digesting the fiber in hot water containing alkali in non-mercerizing amount and a compound of a metal of the iron-cobalt-nickel group.

26. A process which comprises digesting cellulose pulp in water containing a compound of a metal of the iron-cobalt-nickel group, and dissolving the compound from the fiber.

27. A process which comprises digesting cellulose pulp at room temperature in water containing an oxidant and a compound of a metal of the iron-cobalt-nickel group.

28. A process which comprises digesting cellulose pulp in water containing an oxidant, an alkali, and a compound of a metal of the iron-cobalt-nickel group.

29. A process which comprises digesting cellulose pulp in water containing a hypochlorite, an alkali, and a compound of a metal of the iron-cobalt-nickel group.

30. A process which comprises digesting cellulose pulp in a solution of ferric nitrate.

31. A process which comprises digesting cellulose pulp in a hot solution of ferric nitrate.

32. A process which comprises digesting cellulose pulp in a solution of ferric nitrate, treating the digested pulp with a reagent capable of dissolving the ferric nitrate from the pulp, and washing the pulp free of reagent.

33. A process which comprises digesting pulp in water in which caustic soda and ferric nitrate have been dissolved, treating the digested pulp with an oxalic acid solution, and washing the pulp free of solution.

In testimony whereof I have affixed my signature.

GEORGE A. RICHTER.